United States Patent Office.

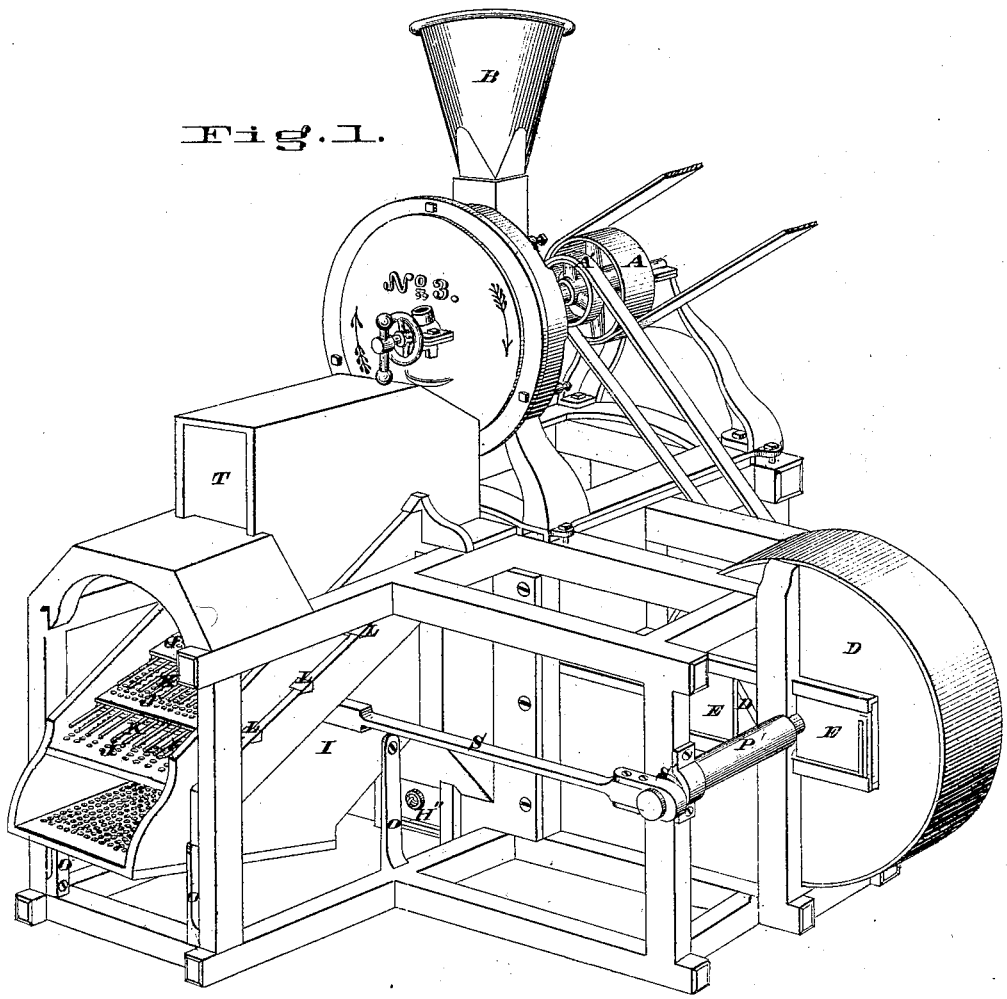

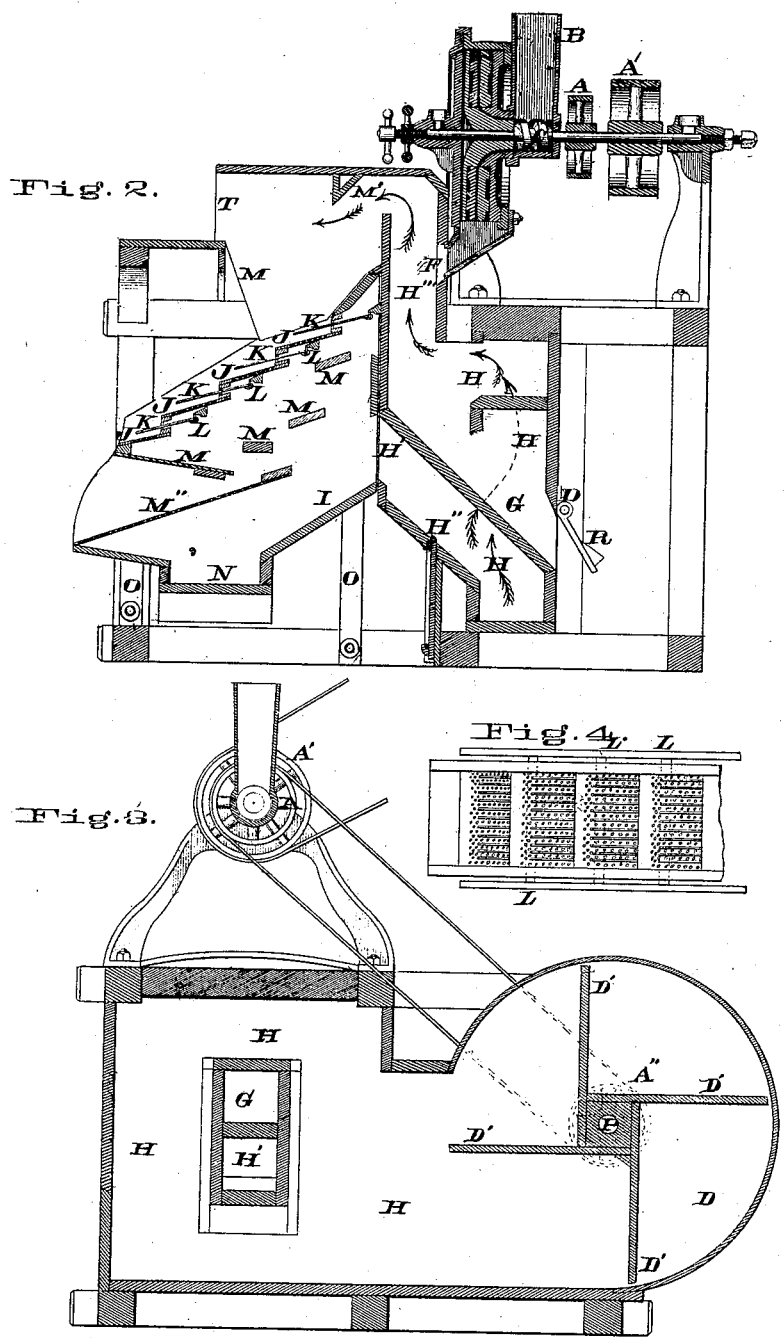

ANDREW J. VANDEGRIFT, OF COVINGTON, KENTUCKY.

Letters Patent No. 104,799, dated June 28, 1870.

IMPROVED MACHINE FOR HULLING COTTON-SEED, &c.

The Schedule referred to in these Letters Patent and making part of the same

I, ANDREW J. VANDEGRIFT, of Covington, in the county of Kenton and State of Kentucky, have invented certain Improvements in Machinery for Cleaning Cotton-Seed and other purposes.

The first part of my invention consists of a separator to be used in separating the floss and hull from the kernel of cotton-seed after the seed has been acted upon by the hulling mechanism.

The second part of my invention relates to a combination of said separator with the huller shown in the drawings and hereinafter described.

Figure 1 is a perspective view of the huller and separator combined.

Figure 2 is a vertical section through the line $x\,x$, fig. 1.

Figure 3 is a vertical section through the line $y\,y$, fig. 1.

Figure 4 is a plan or top view of the wires and sieves shown in section in fig. 2.

A' is a pulley, which receives the power intended to work huller and separator.

A is a pulley attached to the same shaft, and from which power is conveyed to the pulley A" to operate the separator.

B is a hopper.

C, an endless screw at bottom of the hopper, and which conveys the cotton-seed between the hulling-plates, at their center.

In the operation of removing the hulls and floss from the cotton-seed, it passes from the center to the periphery of the plates, and from thence the kernel and floss pass in one stream through the spout F into the air-chamber of the separator.

Set-screws are shown at either end of the revolving shaft of the huller, by means of which the distance of the plates from each other may be adjusted.

The grinding-plate furthest from the hopper revolves. The other is permanently fixed to the frame-work of the huller.

The construction of these plates is more particularly described in Letters Patent No. 93,913, granted Henry Shaw, for "Improvement in grinding-mills," dated the 17th day of August, 1869, and their dress or hulling-surfaces are more clearly shown and described in Letters Patent that have been ordered to issue to Henry Shaw for "improvement in hulling-surfaces for cotton-seed hullers," but which are not yet issued.

D, fig. 3, is a fan, and

D' the wings.

E, fig. 1, is a sliding door for regulating the quantity of air admitted thereto.

P is a shaft receiving its power from pulley A".

S is a wooden pitman worked by a cam, S', on the end of the shaft P.

I is a box containing the sieves, which is rigidly attached to four vertical springs, O O.

The pitman S passes through both sides of the box I, under the sieves, and is rigidly attached thereto.

J J are metallic sieves placed in the relative positions shown in fig. 2.

K K K are a series of rows of wires, there being one row placed immediately above each sieve, J, in the manner shown, fig. 2.

L L are a series of cross-pieces over which the box I slides, their ends being made fast outside the box to the frame-work, so as to keep them stationary.

The inner ends of the wires K are made fast, as shown, fig. 2, to these cross-pieces.

M' M', fig. 2, are deflectors to guide the floss, hull, and adhering kernel to the wires K K and sieves J J.

M M are a series of inclined tables arranged so as to catch and carry the fine portions of the kernel that have passed through the sieves J J to the sieve M".

N is a chamber to receive the pulverized portions of the cotton-seed as it falls from the sieves. It has a delivery-spout, not shown in the drawings.

H is a reservoir or air-chamber which receives air from the fan D.

G is a conduit through which the kernel or cleansed seed passes from the separator.

R is a valve at the aperture of said conduit. Said valve has a small weight attached to it to prevent the escape at this part of the currents of air.

H' is an aperture to permit a small current of air to pass in under the sieves.

H" is a sliding valve to regulate the opening H', and thereby the strength of the blast that passes under the sieves. The purpose of this current of air is to prevent the sieves being clogged by particles of kernel.

T is an aperture through which the blast, after it has deposited the floss, hull, and fine particles of kernel on the wires and sieves, may escape, carrying with it whatever of dust there may have been in the cotton-seed.

The operation of the separator is as follows:

The floss, hulls, and kernels pass in one stream from the spout F into the air-passage H'''. At their entrance they are met by a current of air which has passed from the fan, and in the direction of the arrows, fig. 2, through the reservoir H and air-passage H''', which carries the floss and hull, and with them some adhering particles of the kernel that have been broken in the huller, up in the direction of the arrows, when it strikes the deflectors M' M', and is by them thrown on the first row of wires K. The clean kernels in the mean time have passed, by their greater gravity, down the conduit G and out of the separator at the valve R.

It will have been observed from the foregoing description of the mode of attachment of the wires K, that they have a motion in addition to the motion of the box I, in which they are placed. One end of each wire being attached to the fixed cross-pieces L L, and at a point a short distance from said attachment, they are held by a strip of leather, through which they pass, which strip is fixed in and moves with the box I, thus giving an unequal motion to the different parts of each of said wires.

As shown in the drawings, the motion of the wires K is at all times in the same direction as the motion of the box I, but its range is greater.

When it is desired to give greater sweep to the points of the wires K over the sieves J J, the point of attachment of the wires K may be reversed, that is to say, the stationary cross-pieces L L may form the bearer of the wires K, the rear end of the wires being attached to a rod somewhat in the rear of the cross-pieces L L, and fixed to the shaker-box I, and moving with it.

When thus arranged, the points of the wires K at all times move in a direction opposite to the direction in which the box I is moving, thereby more thoroughly agitating and beating up the material to be separated.

When the floss comes upon the wires their motion causes the particles of kernel to be shaken from it to the sieves, where it is again agitated throughout their length, the particles of kernel passing through and being deflected to the sieve M", where it is again agitated, but more gently than before, that any particles of refuse which have passed through the other sieves may not pass through this.

From the sieve M" the fine portions of the kernel pass into the chamber N, from whence it falls from the separator through an opening for that purpose provided.

Having thus described my invention,

What I claim as new, and desire to secure by Letters Patent, is—

1. The hinged wires K and stationary pieces L, in combination with the sieves J, arranged to operate substantially as as described.

2. The combination of a series of sieves so arranged that the material which passes through any one sieve shall not fall on any other sieve, substantially as set forth.

3. In combination with the cotton-seed huller, constructed substantially as described, the separator, when constructed as set forth, and arranged in relation to the huller, substantially as herein shown and described.

A. J. VANDEGRIFT.

Witnesses:
  S. S. MORRIS,
  M. W. OLIVER.